(12) United States Patent
Yamada et al.

(10) Patent No.: US 12,308,394 B2
(45) Date of Patent: May 20, 2025

(54) RECTANGULAR SECONDARY BATTERY

(71) Applicant: SANYO Electric Co., Ltd., Daito (JP)

(72) Inventors: Tomoyuki Yamada, Hyogo (JP); Naoki Imachi, Hyogo (JP); Daisuke Ikeda, Hyogo (JP); Kazuaki Tamura, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 227 days.

(21) Appl. No.: 17/311,953

(22) PCT Filed: Dec. 16, 2019

(86) PCT No.: PCT/JP2019/049117
§ 371 (c)(1),
(2) Date: Jun. 8, 2021

(87) PCT Pub. No.: WO2020/129881
PCT Pub. Date: Jun. 25, 2020

(65) Prior Publication Data
US 2022/0069359 A1    Mar. 3, 2022

(30) Foreign Application Priority Data

Dec. 19, 2018 (JP) ................................. 2018-236848

(51) Int. Cl.
*H01M 10/0587* (2010.01)
*H01M 4/70* (2006.01)
(Continued)

(52) U.S. Cl.
CPC ......... *H01M 10/0587* (2013.01); *H01M 4/70* (2013.01); *H01M 10/0431* (2013.01);
(Continued)

(58) Field of Classification Search
CPC .... H01M 50/103; H01M 50/176; H01M 5/15; H01M 50/457; Y02E 60/10; Y02P 70/50; Y02T 10/70
See application file for complete search history.

(56) References Cited

U.S. PATENT DOCUMENTS

2006/0222937 A1    10/2006  Morimoto et al.
2010/0035132 A1*  2/2010   Park ..................... H01M 50/627
                                                              429/94
(Continued)

FOREIGN PATENT DOCUMENTS

JP    2006-278142 A    10/2006
JP    2010-097785 A    4/2010
(Continued)

OTHER PUBLICATIONS

JP2017112055A—machine translation (Year: 2017).*
(Continued)

*Primary Examiner* — Haroon S. Sheikh
(74) *Attorney, Agent, or Firm* — WHDA, LLP

(57) ABSTRACT

A rectangular secondary battery is provided with: a rectangular exterior body having an opening, a bottom part, a first lateral wall, a second lateral wall, a third lateral wall, and a fourth lateral wall; a sealing plate for sealing the opening; and a flat wound electrode body obtained by winding a positive electrode plate and a negative electrode plate with a separator therebetween, wherein a plurality of the flat wound electrode bodies are arranged in the rectangular exterior body. The flat wound electrode bodies each have: a flat region formed at the center, a first bent region having a bent outer surface and being formed on one end side of the flat region; and a second bent region having a bent outer surface and being formed on the other end side of the flat region.

10 Claims, 8 Drawing Sheets

(51) Int. Cl.
- *H01M 10/04* (2006.01)
- *H01M 10/0585* (2010.01)
- *H01M 50/103* (2021.01)
- *H01M 50/183* (2021.01)
- *H01M 50/409* (2021.01)
- *H01M 50/528* (2021.01)
- *H01M 50/533* (2021.01)

(52) U.S. Cl.
CPC ..... *H01M 10/0585* (2013.01); *H01M 50/103* (2021.01); *H01M 50/183* (2021.01); *H01M 50/409* (2021.01); *H01M 50/528* (2021.01); *H01M 50/533* (2021.01); *H01M 2220/20* (2013.01)

(56) References Cited

U.S. PATENT DOCUMENTS

| | | | | |
|---|---|---|---|---|
| 2011/0052976 A1* | 3/2011 | Ishii | ............ | H01M 50/533 |
| | | | | 429/178 |
| 2011/0076569 A1 | 3/2011 | Kimura et al. | | |
| 2012/0202097 A1* | 8/2012 | Kimura | ............ | H01M 10/0587 |
| | | | | 429/94 |
| 2014/0045033 A1* | 2/2014 | Zhang | ............ | H01M 50/417 |
| | | | | 429/145 |
| 2015/0194705 A1* | 7/2015 | Ueno | ............ | H01M 10/0431 |
| | | | | 429/94 |
| 2016/0099457 A1 | 4/2016 | Park et al. | | |

FOREIGN PATENT DOCUMENTS

| | | | |
|---|---|---|---|
| JP | 2011-204469 | A | 10/2011 |
| JP | 2014-220251 | A | 11/2014 |
| JP | 2016-110747 | A | 6/2016 |
| JP | 2017112055 | A * | 6/2017 |
| JP | 2017-139085 | A | 8/2017 |
| JP | 6194805 | B2 | 9/2017 |

OTHER PUBLICATIONS

The Extended European Search Report dated Jan. 21, 2022, issued in counterpart EP Application No. 19901209.7. (9 pages).

English Translation of International Search Report dated Mar. 3, 2020, issued in counterpart Application No. PCT/JP2019/049117. (2 pages).

Examination Report dated Sep. 17, 2021, issued in counterpart IN application No. 202147030046. (7 pages).

English Translation of Search Report dated Aug. 20, 2024, issued in counterpart CN Application No. 201980068009.7. (3 pages).

* cited by examiner

RECTANGULAR SECONDARY BATTERY

TECHNICAL FIELD

The present invention relates to a rectangular secondary battery.

BACKGROUND ART

In a power source for driving of an electric vehicle (EV), a hybrid electric vehicle (HEV, PHEV), or the like, rectangular secondary batteries such as an alkali secondary battery and a non-aqueous electrolyte secondary battery have been used.

In each of the rectangular secondary batteries, rectangular exterior member in a shape of a bottomed hollow cylinder having an opening and a sealing plate that seals the opening constitute a battery case. An electrode assembly composed of a positive electrode plate, a negative electrode plate, and a separator, together with an electrolyte, is accommodated in the battery case. A positive electrode terminal and a negative electrode terminal are attached to the sealing plate. The positive electrode terminal is electrically connected to the positive electrode plate via a positive electrode current collector, and the negative electrode terminal is electrically connected to the negative electrode plate via a negative electrode current collector.

As the rectangular secondary battery, a rectangular secondary battery in which a plurality of flat-shaped wound electrode assemblies each obtained by winding a strip-shaped positive electrode plate and a strip-shaped negative electrode plate via a strip-shaped separator are arranged in a battery case has been proposed (Patent Literature 1, described below).

CITATION LIST

Patent Literature

PATENT LITERATURE 1: Japanese Patent Application No. 6194805

SUMMARY

A winding fastening tape is preferably attached to a winding-end-side end portion of a separator on an outermost surface of a wound electrode assembly. However, the thickness of a portion to which the winding fastening tape is attached in the wound electrode assembly may become larger by the thickness of the winding fastening tape than the thickness of the other portion. Particularly, if a plurality of wound electrode assemblies are accommodated in a battery case, a plurality of winding fastening tapes exist.

Accordingly, the total thickness of the plurality of wound electrode assemblies may increase depending on a positional relationship among respective winding fastening tapes in the wound electrode assemblies. A problem is that when the total thickness of the plurality of wound electrode assemblies increases, insertability in inserting each of the wound electrode assemblies into an exterior member decreases and the thickness of a battery increases.

It is an advantage of the present invention to prevent, in a rectangular secondary battery in which a plurality of wound electrode assemblies are arranged in a battery case, insertability in inserting each of the wound electrode assemblies into an exterior member from decreasing and prevent the total thickness of a battery from increasing.

According to an aspect of the present invention, a rectangular secondary battery comprising
- a rectangular exterior member having an opening, a bottom, a first side wall, a second side wall, a third side wall, and a fourth side wall,
- a sealing plate that seals the opening, and
- a plurality of wound electrode assemblies with a flat shape respectively obtained by winding a positive electrode plate and a negative electrode plate via a separator,
- the plurality of wound electrode assemblies being arranged in the rectangular exterior member,
- wherein each of the wound electrode assemblies has a flat region formed at its center, a first bending region having a bent outer surface formed on one end side of the flat region, and a second bending region having a bent outer surface formed on the other end side of the flat region,
- a tape is attached to the outer surface of the first bending region,
- the plurality of wound electrode assemblies are arranged in the rectangular exterior member in a direction in which their respective winding axes are perpendicular to the bottom, and
- the plurality of wound electrode assemblies are arranged in the rectangular exterior member such that the respective first bending regions are positioned on the side of the first side wall.

According to the present invention, it is possible to prevent, in a rectangular secondary battery in which a plurality of wound electrode assemblies are arranged in a battery case, insertability in inserting each of the wound electrode assemblies into an exterior member from decreasing and prevent the total thickness of the battery from increasing.

DESCRIPTION OF EMBODIMENTS

A configuration of a rectangular secondary battery 30 as a rectangular secondary battery according to an embodiment will be described below. The present invention is not limited to embodiment described below.

Figure 1:
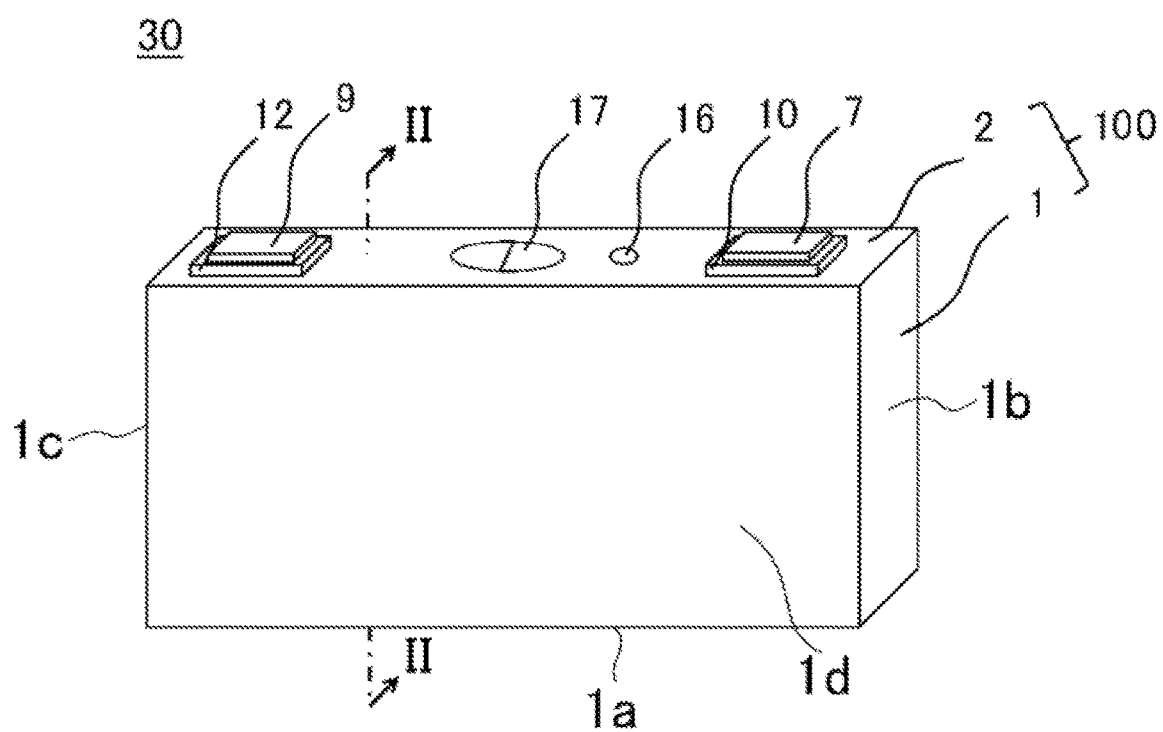
FIG. 1 is a perspective view of a rectangular secondary battery according to an embodiment.
Figure 2:
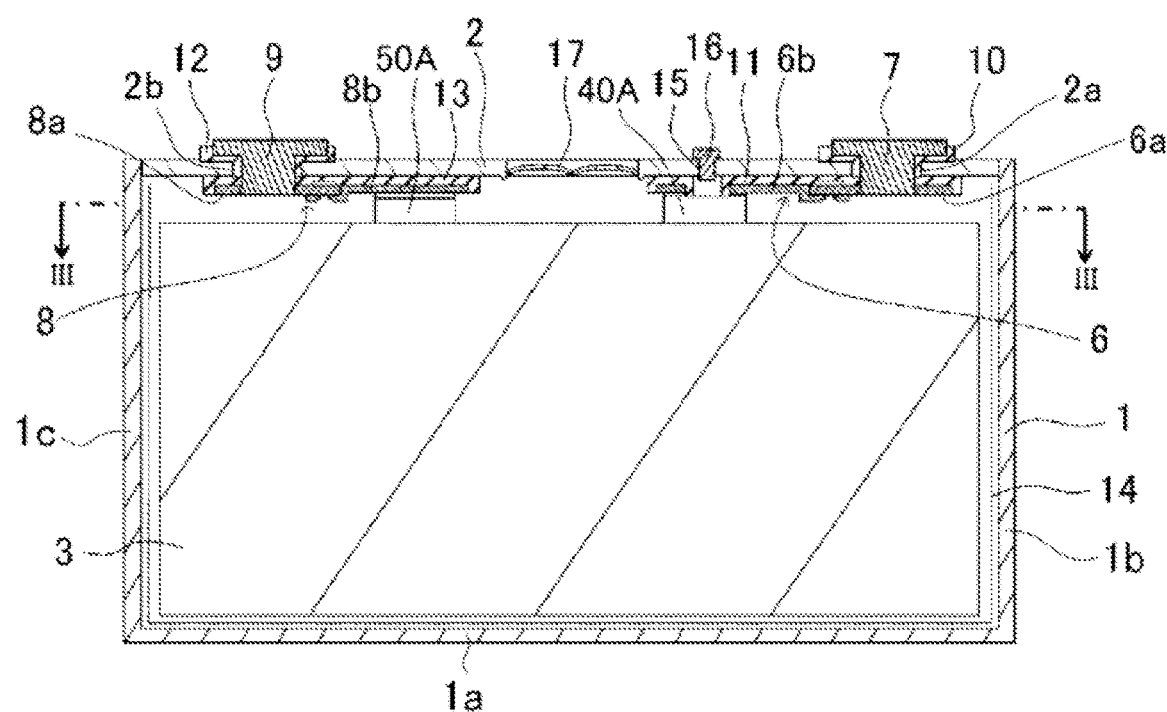
FIG. 2 is a cross-sectional view along a line II-II illustrated in FIG. 1.

As illustrated in FIG. 1 and FIG. 2, the rectangular secondary battery 30 comprises a battery case 100 composed of rectangular exterior member 1 in a shape of a bottomed hollow rectangular cylinder having an opening and a sealing plate 2 that seals the opening of the rectangular exterior member 1. The rectangular exterior member 1 has a bottom 1a, a first side wall Tb, a second side wall 1c, a third side wall 1d, and a fourth side wall 1e. The first side wall 1b and the second side wall 1c are arranged to oppose each other, and the third side wall 1d and the fourth side wall 1e are arranged to oppose each other. The areas of the third side wall 1d and the fourth side wall 1e are respectively larger than the areas of the first side wall 1b and the second side wall 1c. The rectangular exterior member 1 and the sealing plate 2 are each made of a metal. A wound electrode assembly 3 including a positive electrode plate and a negative electrode plate, together with an electrolyte, is accommodated in the rectangular exterior member 1.

Figure 3:
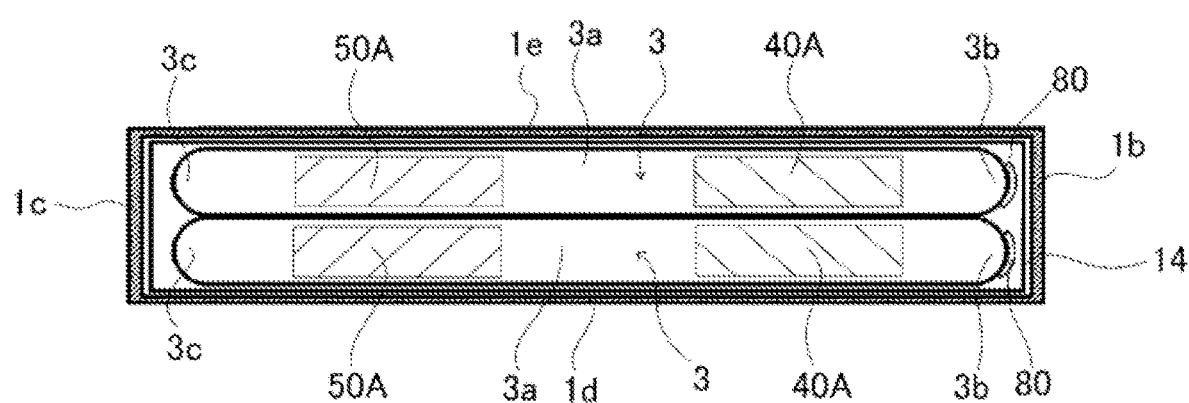
FIG. 3 is a cross-sectional view along a line III-III illustrated in FIG. 2.

As illustrated in FIG. 3, two wound electrode assemblies 3 are arranged in a direction in which respective winding axes are perpendicular to the bottom T a of the rectangular exterior member 1 in the battery case 100. The wound electrode assemblies 3 each have a flat region 3a formed in its central portion, a first bending region 3b formed on the one end side of the flat region 3a, and a second bending region 3c formed on the other end side of the flat region 3a. The flat region 3a has a pair of flat outer peripheral surfaces. Each of the first bending region 3b and the second bending region 3c has a bent outer peripheral surface. In the rectangular secondary battery 30, a winding fastening tape 80 is attached to the outer peripheral surface of the first bending region 3b. The first bending region 3b is arranged on the first side wall Tb side of the rectangular exterior member 1. An electrode assembly holder 14 composed of a resin sheet made of resin is arranged between the wound electrode assembly 3 and the rectangular exterior member 1. Accordingly, the winding fastening tape 80 opposes the first side wall 1b of the rectangular exterior member 1 via an electrode assembly holder 14.

A positive electrode tab group 40A composed of a plurality of positive electrode tabs 40 and a negative electrode tab group 50A composed of a plurality of negative electrode tabs 50 are provided in an end portion on the sealing plate 2 side of the wound electrode assembly 3. The positive electrode tab group 40A is electrically connected to a positive electrode terminal 7 via a second positive electrode current collector 6b and a first positive electrode current collector 6a. The negative electrode tab group 50A is electrically connected to a negative electrode terminal 9 via a second negative electrode current collector 8b and a first negative electrode current collector 8a.

The first positive electrode current collector 6a, the second positive electrode current collector 6b, and the positive electrode terminal 7 are each preferably made of a metal and more preferably made of aluminum or an aluminum alloy. An outer-side insulating member 10 made of resin is arranged between the positive electrode terminal 7 and the sealing plate 2. An inner-side insulating member 11 made of resin is arranged between the first positive electrode current collector 6a and the second positive electrode current collector 6b and the sealing plate 2.

The first negative electrode current collector 8a, the second negative electrode current collector 8b, and the negative electrode terminal 9 are each preferably made of a metal and more preferably made of copper or a copper alloy. The negative electrode terminal 9 preferably has a portion made of aluminum or an aluminum alloy and a portion made of copper or a copper alloy. In this case, the portion made of copper or a copper alloy is preferably connected to the first negative electrode current collector 8a, and the portion made of aluminum and an aluminum alloy preferably protrudes more outwardly than the sealing plate 2. An outer-side insulating member 12 made of resin is arranged between the negative electrode terminal 9 and the sealing plate 2. An inner-side insulating member 13 made of resin is arranged between the first negative electrode current collector 8a and the second negative electrode current collector 8b and the sealing plate 2.

An electrode assembly holder 14 composed of a resin sheet made of resin is arranged between the wound electrode assembly 3 and the rectangular exterior member 1. The electrode assembly holder 14 is preferably molded by bending the insulating sheet made of resin in a bag shape or a box shape. The sealing plate 2 is provided with an electrolyte injection hole 15, and the electrolyte injection hole 15 is sealed with a sealing member 16. The sealing plate 2 is provided with a gas discharge valve 17 that is broken when pressure in the battery case 100 reaches a predetermined value or more and discharges gas in the battery case 100 to outside the battery case 100.

Then, details of a method of manufacturing the rectangular secondary battery 30 and each component in the rectangular secondary battery 30 will be described.
[Positive Electrode Plate]
First, a method of manufacturing a positive electrode plate will be described.
[Production of Positive Electrode Active Material Mixture Layer Slurry]
A lithium-nickel-cobalt-manganese composite oxide as a positive electrode active material, polyvinylidene fluoride (PVdF) as a binder, a carbon material as a conductive agent, and N-methyl-2-pyrrolidone (NMP) as a dispersion medium are kneaded such that a mass ratio of the lithium-nickel-cobalt-manganese composite oxide, the PVdF, and the carbon material is 97.5:1:1.5, to produce a positive electrode active material mixture layer slurry.
[Production of Positive Electrode Protective Layer Slurry]
Alumina powder, a carbon material as a conductive agent, polyvinylidene fluoride (PVdF) as a binder, and N-methyl-2-pyrrolidone (NMP) as a dispersion medium are kneaded such that a mass ratio of the alumina powder, the carbon material, and the PVdF is 83:3:14, to produce a protective layer slurry.
[Formation of Positive Electrode Active Material Mixture Layer and Positive Electrode Protective Layer]
The positive electrode active material mixture layer slurry and the positive electrode protective layer slurry produced using the above-described method are applied to both surfaces of an aluminum foil having a thickness of 15 m as a positive electrode core body by a die coater. At this time, the positive electrode active material mixture layer slurry is applied to a center in a width direction of the positive electrode core body. The positive electrode protective layer slurry is applied to both ends in a width direction of a region to which the positive electrode active material mixture layer slurry is applied.

The positive electrode core body to which the positive electrode active material mixture layer slurry and the positive electrode protective layer slurry are applied is dried, to remove the NMP included in each of the positive electrode active material mixture layer slurry and the positive electrode protective layer slurry. As a result, the positive electrode active material mixture layer and the positive electrode protective layer are formed. Then, the positive electrode active material mixture layer is compressed by being passed between paired press rollers, to obtain a positive electrode original plate. The positive electrode original plate is cut to have a predetermined shape, to produce a positive electrode plate 4.

Figure 4:
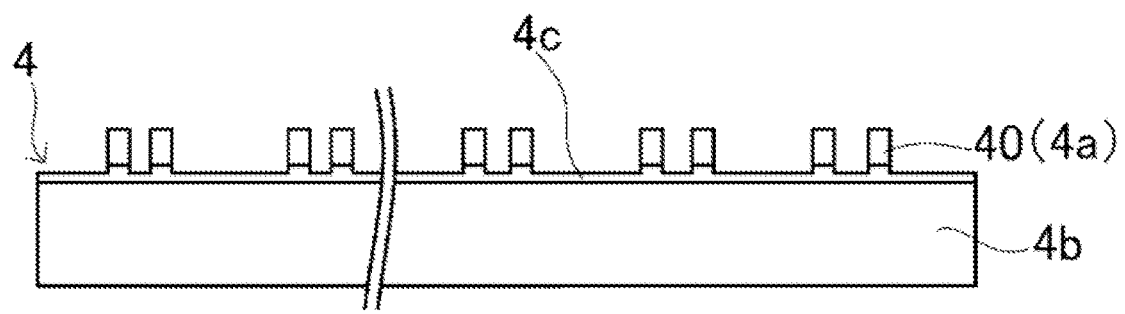
FIG. 4 is a plane view of a positive electrode plate according to the embodiment.

FIG. 4 is a plan view of the positive electrode plate 4. The positive electrode plate 4 has a positive electrode active material mixture layer 4*b* formed on both surfaces of a positive electrode core body 4*a*. A plurality of positive electrode tabs 40 each composed of the positive electrode core body 4*a* are provided in one end portion in a width direction of the positive electrode plate 4. A positive electrode protective layer 4*c* is provided at a root of the positive electrode tab 40. The positive electrode protective layer 4*c* can also be omitted.

[Negative Electrode Plate]

Then, a method of manufacturing a negative electrode plate will be described.

[Production of Negative Electrode Active Material Mixture Layer Slurry]

Graphite as a negative electrode active material, styrene-butadiene rubber (SBR) and carboxymethyl cellulose (CMC) as a binder, and water as a dispersion medium are kneaded such that a mass ratio of the graphite, the SBR, and the CMC is 98:1:1, to produce a negative electrode active material mixture layer slurry.

[Formation of Negative Electrode Active Material Mixture Layer]

The negative electrode active material mixture layer slurry produced using the above-described method is applied to both surfaces of a copper foil having a thickness of 8 m as a negative electrode core body by a die coater.

The negative electrode core body to which the negative electrode active material mixture layer slurry is applied is dried, to remove the water in the negative electrode active material mixture layer slurry. As a result, the negative electrode active material mixture layer is formed. Then, the negative electrode active material mixture layer is compressed by being passed between paired press rollers, to obtain a negative electrode original plate. The negative electrode original plate is cut to have a predetermined shape, to produce a negative electrode plate 5.

Figure 5:
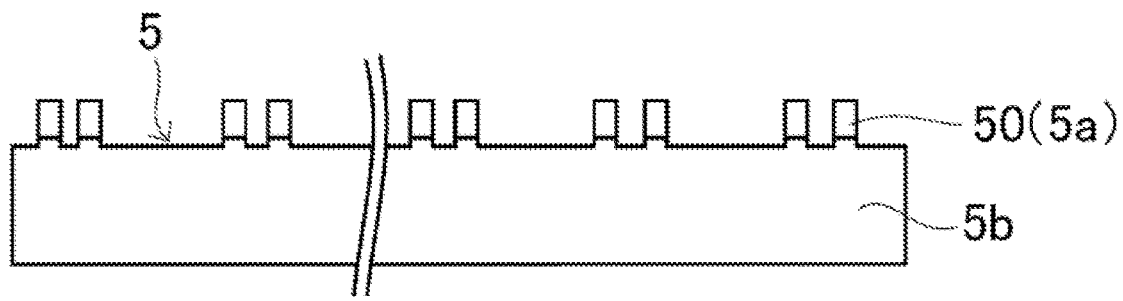
FIG. 5 is a plane view of a negative electrode plate according to the embodiment.

FIG. 5 is a plan view of the negative electrode plate 5. The negative electrode plate 5 has a negative electrode active material mixture layer 5*b* formed on both surfaces of a negative electrode core body 5*a*. A plurality of negative electrode tabs 50 each composed of the negative electrode core body 5*a* are provided in one end portion in a width direction of the negative electrode plate 5.

[Production of Wound Electrode Assembly]

Figure 6:
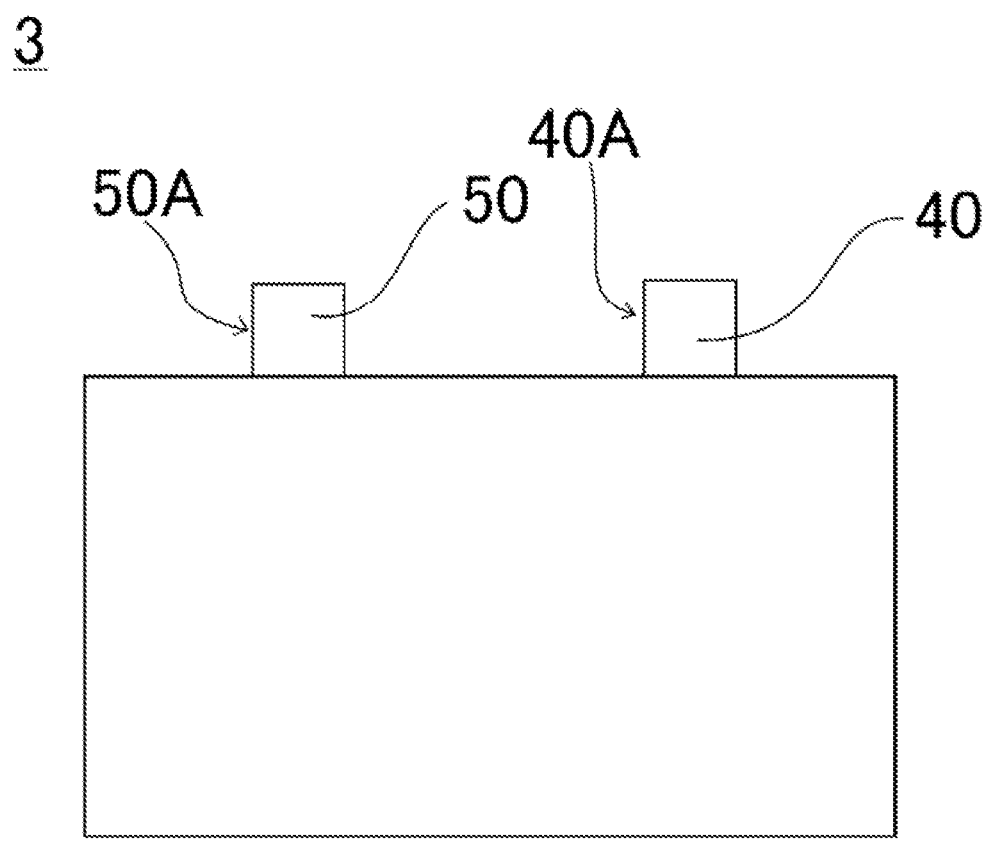
FIG. 6 is a plane view of a wound electrode assembly according to the embodiment.

The strip-shaped positive electrode plate 4 and the strip-shaped negative electrode plate 5 produced using the above-described method are each wound via a strip-shaped separator, to produce the flat-shaped wound electrode assembly 3. FIG. 6 is a plan view of the wound electrode assembly 3. A positive electrode tab group 40A composed of the plurality of positive electrode tabs 40 and a negative electrode tab group 50A composed of the plurality of negative electrode tabs 50 are provided in one end portion of the wound electrode assembly 3.

[Connection Between Current Corrector and Tab]

Figure 7:
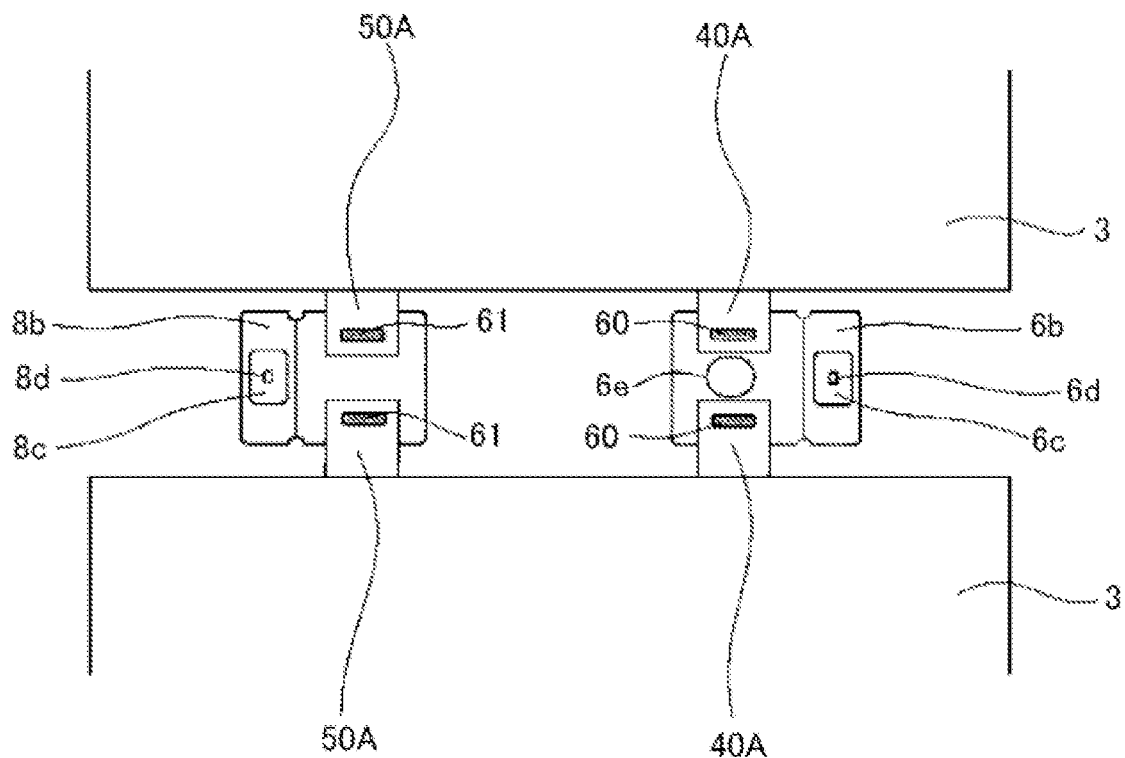
FIG. 7 is a diagram illustrating a state where a positive electrode tab group is connected to a second positive electrode current collector and a negative electrode tab group is connected to a second negative electrode current collector.

As illustrated in FIG. 7, respective positive electrode tab groups 40A in two wound electrode assemblies 3 are connected to a second positive electrode current collector 6*b*, and respective negative electrode tab groups 50A in the wound electrode assemblies 3 are connected to the second negative electrode current collector 8*b*. The positive electrode tab groups 40A are welded and connected to the second positive electrode current collector 6*b*, to respectively form welding and connection parts 60. The negative electrode tab groups 50A are welded and connected to the second negative electrode current collectors 8*b*, to respectively form welding and connection parts 61. For connection between the positive electrode tab group 40A and the second positive electrode current collector 6*b* and connection between the negative electrode tab group 50A and the second negative electrode current collector 8*b*, ultrasonic welding, resistance welding, laser welding, or the like can be preferably used.

A thin-walled part 6*c* is formed in the second positive electrode current collector 6*b*, and a current collector opening 6*d* is formed in the thin-walled part 6*c*. In the thin-walled part 6*c*, the second positive electrode current collector 6*b* is connected to the first positive electrode current collector 6*a*. In the second positive electrode current collector 6*b*, a current collector through hole 6*e* is formed at a position opposing the electrolyte injection hole 15 in the sealing plate 2.

A thin-walled part 8*c* is formed in the second negative electrode current collector 8*b*, and a current collector opening 8*d* is formed in the thin-walled part 8*c*. In the thin-walled part 8*c*, the second negative electrode current collector 8*b* is connected to the first negative electrode current collector 8*a*.

[Attachment of Each Component to Sealing Plate]

Figure 8:
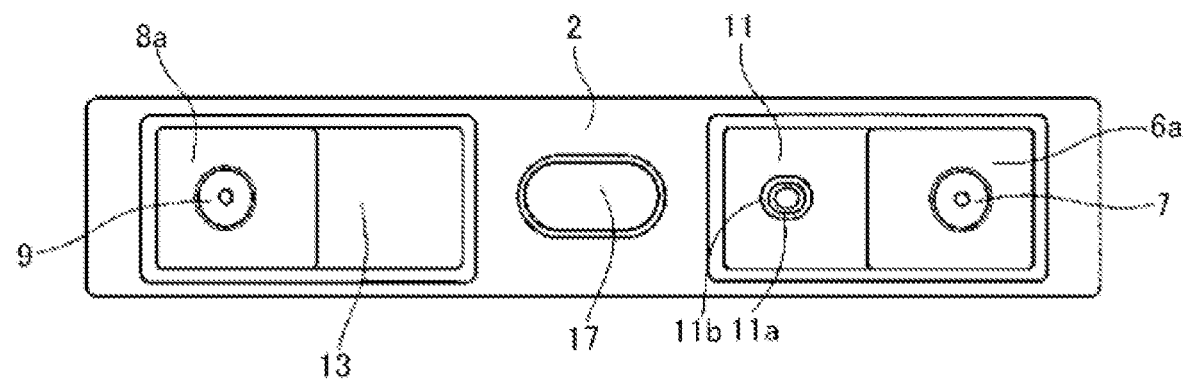
FIG. 8 is a diagram illustrating a surface on the electrode assembly side of a sealing plate after the first positive electrode current collector and the first negative electrode current collector are attached to the sealing plate.

FIG. 8 is a diagram illustrating a surface, on the inner side of the battery, of the sealing plate 2 to which each of components is attached. Each of the components is attached to the sealing plate 2 in the following manner.

The outer-side insulating member 10 is arranged on the outer surface side of the battery around a positive electrode terminal insertion hole 2*a* of the sealing plate 2. The inner-side insulating member 11 and the first positive electrode current collector 6*a* are arranged on the inner surface side of the battery around the positive electrode terminal insertion hole 2*a* of the sealing plate 2. The positive electrode terminal 7 is inserted into a through hole of the outer-side insulating member 10, the positive electrode terminal insertion hole 2*a* of the sealing plate 2, a through hole of the inner-side insulating member 11, and a through hole of the first positive electrode current collector 6*a*, and a distal end of the positive electrode terminal 7 is riveted onto the first positive electrode current collector 6*a*. As a result, the positive electrode terminal 7 and the first positive electrode current collector 6*a* are fixed to the sealing plate 2. The riveted portion of the positive electrode terminal 7 and the first positive electrode current collector 6*a* are preferably welded and connected to each other.

The outer-side insulating member 12 is arranged on the outer surface side of the battery around a negative electrode terminal insertion hole 2*b* of the sealing plate 2. The inner-side insulating member 13 and the first negative electrode current collector 8a are arranged on the inner surface side of the battery around the negative electrode terminal insertion hole 2b of the sealing plate 2. The negative electrode terminal 9 is inserted into a through hole of the outer-side insulating member 12, the negative electrode terminal insertion hole 2b of the sealing plate 2, a through hole of the inner-side insulating member 13, and a through hole of the first negative electrode current collector 8a, and a distal end of the negative electrode terminal 9 is riveted onto the first negative electrode current collector 8a. As a result, the negative electrode terminal 9 and the first negative electrode current collector 8a are fixed to the sealing plate 2. The riveted portion of the negative electrode terminal 9 and the first negative electrode current collector 8a are preferably welded and connected to each other.

In the inner-side insulating member 11, a portion opposing the electrolyte injection hole 15 provided in the sealing plate 2 is provided with an injection opening 11a. An edge portion of the injection opening 11a is provided with a cylindrical part 11b.

[Connection Between First Current Corrector and Second Current Collector]

Figure 9:
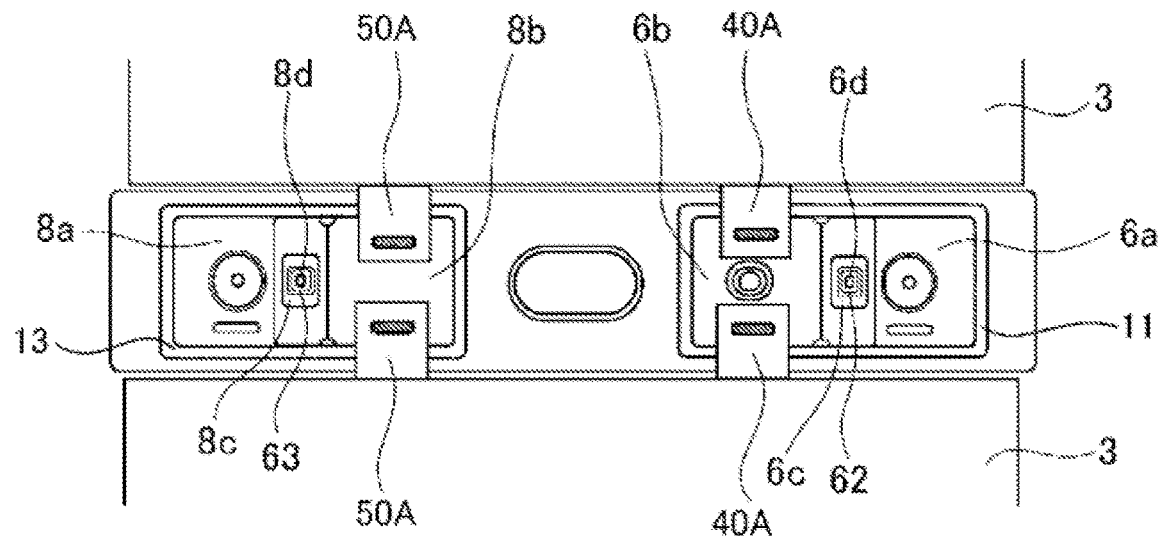
FIG. 9 is a diagram illustrating a surface on the electrode assembly side of the sealing plate after the second positive electrode current collector is attached to the first positive electrode current collector and the second negative electrode current collector is attached to the first negative electrode current collector.

FIG. 9 is a diagram illustrating a surface, on the inner side of the battery, of the sealing plate 2 after the second positive electrode current collector 6b is attached to the first positive electrode current collector 6a and the second negative electrode current collector 8b is attached to the first negative electrode current collector 8a.

The second positive electrode current collector 6b to which the positive electrode tab group 40A is connected is arranged on the inner-side insulating member 11 such that its part overlaps the first positive electrode current collector 6a. The thin-walled part 6c is irradiated with a laser, to weld and connect the second positive electrode current collector 6b and the first positive electrode current collector 6a to each other, thereby forming a welding and connection part 62. The second negative electrode current collector 8b to which the negative electrode tab group 50A is connected is arranged on the inner-side insulating member 13 such that its part overlaps the first negative electrode current collector 8a. The thin-walled part 8c is irradiated with a laser, to weld and connect the second negative electrode current collector 8b and the first negative electrode current collector 8a to each other, thereby forming a welding and connection part 63.

[Production of Secondary Battery]

The two positive electrode tab groups 40A and the two negative electrode tab groups 50A are bent such that an upper surface of the one wound electrode assembly 3 and an upper surface of the other wound electrode assembly 3 in FIG. 9 contact each other directly or via another member. As a result, the two wound electrode assemblies 3 are integrated. The two wound electrode assemblies 3 are arranged within the electrode assembly holder 14 composed of an insulating sheet molded in a box shape or a bag shape.

The one positive electrode tab group 40A and the other positive electrode tab group 40A are respectively bent in different directions. The one negative electrode tab group 50A and the other negative electrode tab group 50A are respectively bent in different directions.

The two wound electrode assemblies 3 wrapped by the electrode assembly holder 14 are inserted into the rectangular exterior member 1. The sealing plate 2 and the rectangular exterior member 1 are welded to each other, and the opening of the rectangular exterior member 1 is sealed with the sealing plate 2. An electrolyte is injected into the rectangular exterior member 1 via the electrolyte injection hole 15 provided in the sealing plate 2. Then, the electrolyte injection hole 15 is sealed with the sealing member 16 such as a blind rivet. As a result, the rectangular secondary battery 30 is completed.

As illustrated in FIG. 3, in the rectangular secondary battery 30, each of the first bending regions 3b to which the winding fastening tapes 80 in the two wound electrode assemblies 3 are respectively attached is arranged on the first side wall 1b side of the rectangular exterior member 1. Accordingly, it is possible to prevent insertability in inserting the wound electrode assembly into the exterior member from decreasing and prevent the thickness of the battery from increasing.

Figure 10:
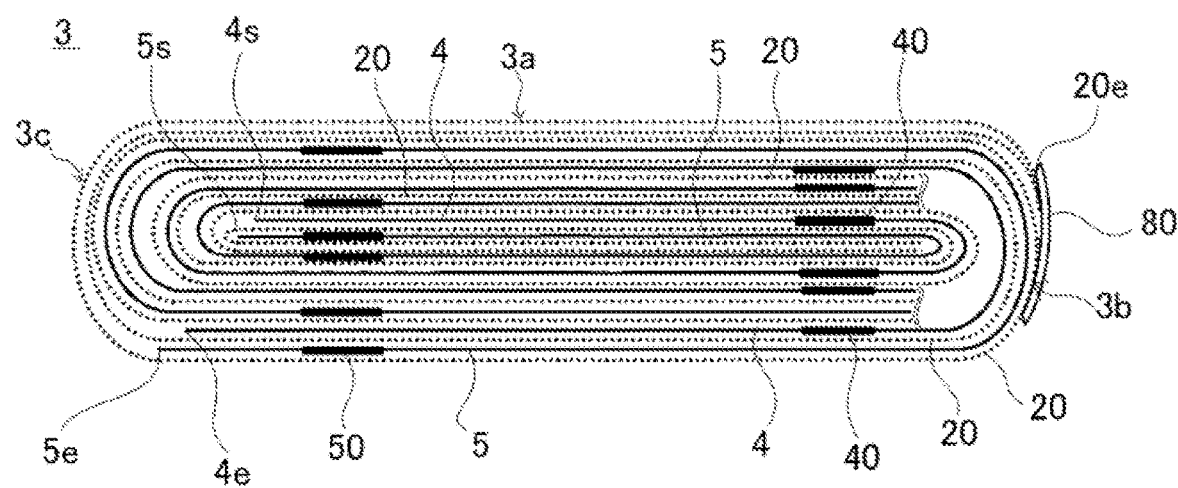
FIG. 10 is a diagram illustrating the wound electrode assembly according to the embodiment as viewed in a winding axis direction.

FIG. 10 is a diagram illustrating the wound electrode assembly 3 in the rectangular secondary battery 30 according to the embodiment as viewed in a winding axis direction. A winding-end-side end portion 20e of a separator 20 is arranged in the first bending region 3b in the wound electrode assembly 3. The winding fastening tape 80 is attached to the outer peripheral surface of the first bending region 3b to cover the winding-end-side end portion 20e of the separator 20.

A winding-end-side end portion 4e of the positive electrode plate 4 is arranged in the flat region 3a in the wound electrode assembly 3 and at a position closer to the second bending region 3c than the first bending region 3b. A winding-end-side end portion 5e of the negative electrode plate 5 is preferably arranged in the flat region 3a in the wound electrode assembly 3 and at a position closer to the second bending region 3c than the first bending region 3b. Such a configuration can reliably prevent the winding-end-side end portion 5e of the negative electrode plate 5 from being exposed even if the separator 20 thermally contracts because the wound electrode assembly 3 enters a high-temperature state.

A winding-start-side end portion 4s of the positive electrode plate 4 is arranged in the flat region 3a in the wound electrode assembly 3 and at a position closer to the second bending region 3c than the first bending region 3b. A winding-start-side end portion 5s of the negative electrode plate 5 is preferably arranged in the flat region 3a in the wound electrode assembly 3 and at a position closer to the second bending region 3c than the first bending region 3b. Such a configuration can prevent a liquid containing property of an inner peripheral portion of the first bending region 3b from decreasing by the winding fastening tape 80.

A distance between the winding-end-side end portion 5e of the negative electrode plate 5 and the negative electrode tab 50 arranged at a position, which is the closest to the winding-end-side end portion 5e of the negative electrode plate 5, in the negative electrode plate 5 in a longitudinal direction of the negative electrode plate 5 is preferably smaller than a distance between the winding-end-side end portion 4e of the positive electrode plate 4 and the positive electrode tab 40 arranged at a position, which is the closest to the winding-end-side end portion 4e of the positive electrode plate 4, in the positive electrode plate 4 in a longitudinal direction of the positive electrode plate 4. Generally, the length of the negative electrode plate 5 is larger than the length of the positive electrode plate 4 on the winding end side of the wound electrode assembly 3. That is, the negative electrode plate 5 more protrudes toward the winding end side (leftward in FIG. 10) than the winding-end-side end portion 4e of the positive electrode plate 4, as illustrated in FIG. 10. Therefore, the above-described configuration enables the distance between the winding-end-side end portion 4e of the positive electrode plate 4 and the positive electrode tab 40 in the positive electrode plate 4 arranged at a position, which is the closest to the winding-end-side end portion 4e of the positive electrode plate 4 to increase. And it enables a distance between the winding-end-side end portion 5e of the negative electrode plate 5 and the negative electrode tab 50 in the negative electrode plate 5 arranged at a position, which is the closest to the winding-end-side end portion 5e of the negative electrode plate 5 to have a certain allowance. In a longitudinal direction of an electrode plate, when a distance between an end portion of the electrode plate and a tab is significantly short, the productivity of the electrode plate may decrease, and the quality of the electrode plate may decrease. Accordingly, the above-described configuration provides a rectangular secondary battery having high productivity and having high reliability.

A distance between the winding-start-side end portion 5s of the negative electrode plate 5 and the negative electrode tab 50 arranged at a position, which is the closest to the winding-start-side end portion 5s of the negative electrode plate 5, in the negative electrode plate 5 in the longitudinal direction of the negative electrode plate 5 is preferably smaller than a distance between the winding-start-side end portion 4s of the positive electrode plate 4 and the positive electrode tab 40 arranged at a position, which is the closest to the winding-start-side end portion 4s of the positive electrode plate 4, in the positive electrode plate 4 in the longitudinal direction of the positive electrode plate 4. Generally, the length of the negative electrode plate 5 is larger than the length of the positive electrode plate 4 on the winding start side of the wound electrode assembly 3. That is, the negative electrode plate 5 more protrudes toward the winding start side (leftward in FIG. 10) than the winding-start-side end portion 4s of the positive electrode plate 4, as illustrated in FIG. 10. Therefore, the above-described configuration enables the distance between the winding-start-side end portion 4s of the positive electrode plate 4 and the positive electrode tab 40 arranged at a position, which is the closest to the winding-start-side end portion 4s of the positive electrode plate 4 to increase, and enables the distance between the winding-start-side end portion 5s of the negative electrode plate 5 and the negative electrode tab 50 arranged at a position, which is the closest to the winding-start-side end portion 5s of the negative electrode plate 5, in the negative electrode plate 5 to have a certain allowance. In a longitudinal direction of an electrode plate, when a distance between an end portion of the electrode plate and a tab is significantly short, the productivity of the electrode plate may decrease, and the quality of the electrode plate may decrease. Accordingly, in the above-described configuration, a rectangular secondary battery having high productivity and having high reliability is manufactured.

As the separator 20, a separator having a base material layer made of polyolefin and a heat resistant layer including ceramic and a binder formed on one surface of the base material layer can be used. In such a case, in the separator, the winding fastening tape 80 can be attached to its surface on which the heat resistant layer is formed.

The positive electrode tab group 40A in the wound electrode assembly 3 is preferably arranged on the side closer to the first bending region 3b than the negative electrode tab group 50A.

In the flat region 3a in the wound electrode assembly 3, when the number of positive electrode plates 4 to be laminated is set to N1 (layers), the number of positive electrode tabs 40 to be laminated is preferably 0.8×N1 or more and more preferably 0.9×N1 or more. In the flat region 3a in the wound electrode assembly 3, when the number of negative electrode plates 5 to be laminated is set to N2 (layers), the number of negative electrode tabs 50 to be laminated is preferably 0.8×N2 or more and more preferably 0.9×N2 or more. In such a configuration, a rectangular secondary battery having a more excellent output characteristic is obtained.

Another Embodiment 1

Figure 11:
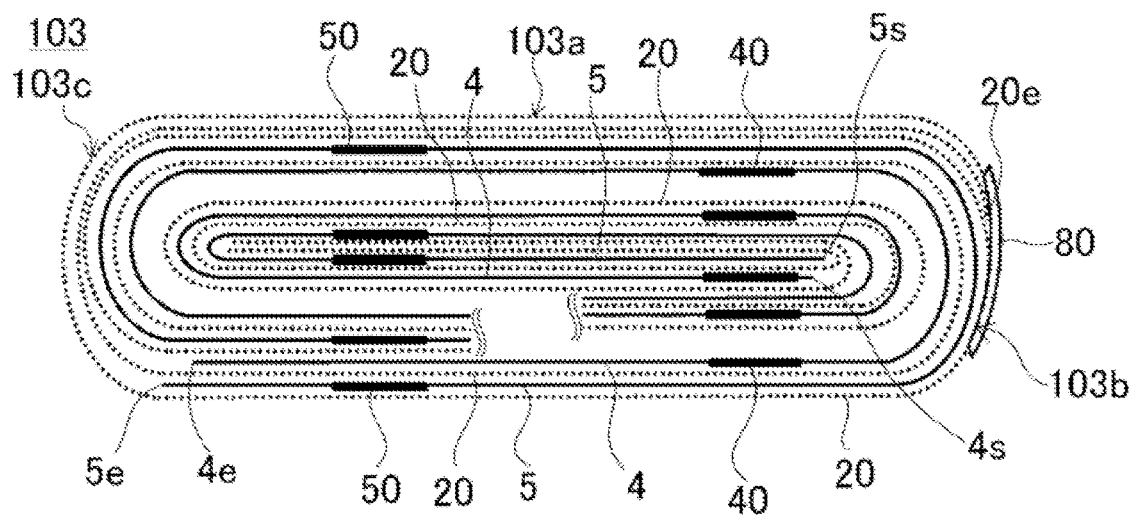
FIG. 11 is a diagram illustrating a wound electrode assembly according to another embodiment as viewed in a winding axis direction.

FIG. 11 is a diagram illustrating a wound electrode assembly 103 according to another embodiment 1 as viewed along a winding axis. Parts common to those in the above-described wound electrode assembly 3 are respectively assigned common numbers.

The wound electrode assembly 103 has a flat region 103a, a first bending region 103b formed on the one end side of the flat region 103a, and a second bending region 103c formed on the other end side of the flat region 103a. In the wound electrode assembly 103, a winding-end-side end portion 4e of a positive electrode plate 4 is arranged in a flat region 3a in a wound electrode assembly 3 and at a position closer to a second bending region 3c than a first bending region 3b, like in the wound electrode assembly 3. A winding-end-side end portion 5e of a negative electrode plate 5 is arranged in the flat region 3a in the wound electrode assembly 3 and at a position closer to the second bending region 3c than the first bending region 3b.

The wound electrode assembly 103 differs from the wound electrode assembly 3 in terms of respective positions of winding-start-side end portions of the positive electrode plate 4 and the negative electrode plate 5. In the wound electrode assembly 103, a winding-start-side end portion 4s of the positive electrode plate 4 is arranged in the flat region 3a in the wound electrode assembly 3 and at a position closer to the first bending region 3b than the second bending region 3c. A winding-start-side end portion 5s of the negative electrode plate 5 is arranged in the flat region 3a in the wound electrode assembly 3 and at a position closer to the first bending region 3b than the second bending region 3c. Such a configuration can effectively prevent the thickness of each of portions in the flat regions 3a from varying.

In respective vicinities of the winding-start-side end portion 4s of the positive electrode plate 4 and the winding-start-side end portion 5s of the negative electrode plate 5 and in respective vicinities of the winding-end-side end portion 4e of the positive electrode plate 4 and the winding-end-side end portion 5e of the negative electrode plate 5, the positive electrode plate 4 and the negative electrode plate 5 do not respectively exist. Accordingly, when the wound electrode assembly is press-molded, the thickness of the flat region easily decreases. Therefore, when the winding-start-side end portion 4s of the positive electrode plate 4 and the winding-start-side end portion 5s of the negative electrode plate 5 and the winding-end-side end portion 4e of the positive electrode plate 4 and the winding-end-side end portion 5e of the negative electrode plate 5 respectively exist close to each other, a locally thin portion may occur in the flat region. In the configuration of the wound electrode assembly 103, such a problem is less likely to occur.

Another Embodiment 2

Figure 12:
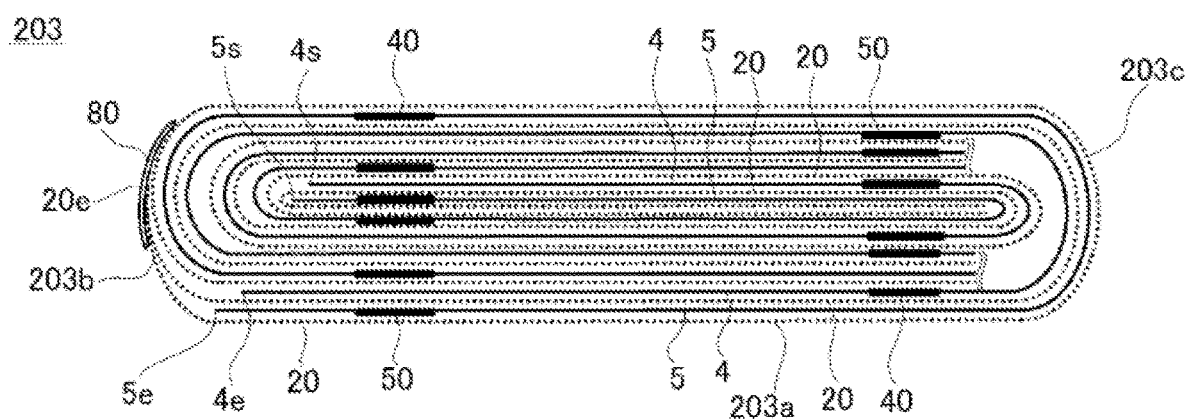
FIG. 12 is a diagram illustrating a wound electrode assembly according to another embodiment as viewed in a winding axis direction.

FIG. 12 is a diagram illustrating a wound electrode assembly 203 according to another embodiment 2 as viewed along a winding axis. Parts common to those in the above-described wound electrode assembly 3 are respectively assigned common numbers.

The wound electrode assembly 203 has a flat region 203a, a first bending region 203b formed on the one end side of the flat region 203a, and a second bending region 203c formed on the other end side of the flat region 203a. In the wound electrode assembly 203, a winding fastening tape 80 is attached to an outer peripheral surface of the first bending region 203b in the wound electrode assembly 203.

A winding-end-side end portion 4e of a positive electrode plate 4 is arranged in the flat region 203a in the wound electrode assembly 203 and at a position closer to the first bending region 203b than the second bending region 203c. A winding-end-side end portion 5e of a negative electrode plate 5 is preferably arranged in the flat region 203a in the wound electrode assembly 203 and at a position closer to the second bending region 203c than the first bending region 203b. Such a configuration enables an amount of a separator to be positioned on an outermost periphery of the wound electrode assembly 203 to decrease, to obtain a rectangular secondary battery having a higher volume energy density.

OTHERS

Although an example in which the two wound electrode assemblies are arranged in the battery case has been illustrated in the above-described embodiments, the number of wound electrode assemblies to be arranged in the battery case may be three or more.

Although an example in which each of the positive electrode current collector and the negative electrode current collector is composed of two components has been illustrated in the above-described embodiments, each of the positive electrode current collector and the negative electrode current collector may be composed of one component.

Known materials can be respectively used for a positive electrode plate, a negative electrode plate, a separator, an electrolyte, and the like.

REFERENCE SIGNS LIST 30 rectangular secondary battery
1 rectangular exterior member
1a bottom
1b first side wall
1c second side wall
1d third side wall
1e fourth side wall
2 sealing plate
2a positive electrode terminal insertion hole
2b negative electrode terminal insertion hole
100 battery case
3 wound electrode assembly
4 positive electrode plate
4a positive electrode core body
4b positive electrode active material mixture layer
4c positive electrode protective layer
40 positive electrode tab
40A positive electrode tab group
20 separator
5 negative electrode plate
5a negative electrode core body
5b negative electrode active material mixture layer
50 negative electrode tab
50A negative electrode tab group
6a first positive electrode current collector
6b second positive electrode current collector
6c thin-walled part
6d current collector opening
6e current collector through hole
7 positive electrode terminal
8a first negative electrode current collector
8b second negative electrode current collector
8c thin-walled part
8d current collector opening
9 negative electrode terminal
10 outer-side insulating member
11 inner-side insulating member
11a injection opening
11b cylindrical part
12 outer-side insulating member
13 inner-side insulating member
14 electrode assembly holder
15 electrolyte injection hole
16 sealing member
17 gas discharge valve
60, 61, 62, 63 welding and connection part
80 tape
103, 203 wound electrode assembly

The invention claimed is:

1. A rectangular secondary battery comprising:
a rectangular exterior member having an opening, a bottom, a first side wall, a second side wall, a third side wall, and a fourth side wall;
a sealing plate that seals the opening; and
a plurality of wound electrode assemblies with a flat shape respectively obtained by winding a positive electrode plate and a negative electrode plate via a separator,
the plurality of wound electrode assemblies being arranged in the rectangular exterior member,
wherein each of the wound electrode assemblies has a flat region formed at its center, a first bending region having a bent outer surface formed on one end side of the flat region, and a second bending region having a bent outer surface formed on the other end side of the flat region,
a tape is attached to the outer surface of the first bending region,
the tape extends across no more than an entire length of the first bending region along a circumferential direction of a corresponding one of the wound electrode assemblies,
an outermost circumferential surface of each of the wound electrode assemblies, other than the first bending region, is free of a tape attached thereto,
the plurality of wound electrode assemblies are arranged in the rectangular exterior member in a direction in which their respective winding axes are perpendicular to the bottom,
each of the plurality of wound electrode assemblies is arranged in the rectangular exterior member such that the respective first bending regions are positioned on the side of the first side wall,
a winding-end-side end portion of the positive electrode plate and a winding-start-side end portion of the positive electrode plate are arranged in the flat region and are directed toward the second bending region, and
a winding-end-side end portion of the negative electrode plate and a winding-start-side end portion of the negative electrode plate are arranged in the flat region and are directed toward the second bending region.

2. The rectangular secondary battery according to claim 1, wherein the tape is attached to the separator positioned on an outermost surface of each of the plurality of wound electrode assemblies.

3. The rectangular secondary battery according to claim 1, wherein
the winding-end-side end portion of the positive electrode plate is arranged at a position closer to the second bending region than the first bending region, and
the winding-end-side end portion of the negative electrode plate is arranged at a position closer to the second bending region than the first bending region.

4. The rectangular secondary battery according to claim 1, wherein
the winding-start-side end portion of the positive electrode plate is arranged at a position closer to the second bending region than the first bending region, and
the winding-start-side end portion of the negative electrode plate is arranged at a position closer to the second bending region than the first bending region.

5. The rectangular secondary battery according to claim 1, wherein
a distance between the winding-end-side end portion of the negative electrode plate and a negative electrode tab arranged at a position, which is the closest to the winding-end-side end portion of the negative electrode plate, in the negative electrode plate in a longitudinal direction of the negative electrode plate is smaller than a distance between the winding-end-side end portion of the positive electrode plate and a positive electrode tab arranged at a position, which is the closest to the winding-end-side end portion of the positive electrode plate, in the positive electrode plate in a longitudinal direction of the positive electrode plate.

6. The rectangular secondary battery according to claim 1, wherein
a distance between the winding-start-side end portion of the negative electrode plate and a negative electrode tab arranged at a position, which is the closest to the winding-start-side end portion of the negative electrode plate, in the negative electrode plate in the longitudinal direction of the negative electrode plate is smaller than a distance between the winding-start-side end portion of the positive electrode plate and a positive electrode tab arranged at a position, which is the closest to the winding-start-side end portion of the positive electrode plate, in the positive electrode plate in the longitudinal direction of the positive electrode plate.

7. The rectangular secondary battery according to claim 1, wherein a layer including ceramic and a binder is provided on a surface to which the tape is attached in the separator.

8. The rectangular secondary battery according to claim 1, wherein
each of the wound electrode assemblies has a positive electrode tab group composed of a plurality of positive electrode tabs and a negative electrode tab group composed of a plurality of negative electrode tabs in an end portion on the side of the sealing plate, and
the positive electrode tab group is positioned on the side closer to the first bending region than the negative electrode tab group.

9. A rectangular secondary battery comprising:
a rectangular exterior member having an opening, a bottom, a first side wall, a second side wall, a third side wall, and a fourth side wall;
a sealing plate that seals the opening; and
a plurality of wound electrode assemblies with a flat shape respectively obtained by winding a positive electrode plate and a negative electrode plate via a separator,
the plurality of wound electrode assemblies being arranged in the rectangular exterior member,
wherein each of the wound electrode assemblies has a flat region formed at its center, a first bending region having a bent outer surface formed on one end side of the flat region, and a second bending region having a bent outer surface formed on the other end side of the flat region,
a tape is attached to the outer surface of the first bending region,
the tape extends across no more than an entire length of the first bending region along a circumferential direction of a corresponding one of the wound electrode assemblies,
an outermost circumferential surface of each of the wound electrode assemblies, other than the first bending region, is free of a tape attached thereto,
the plurality of wound electrode assemblies are arranged in the rectangular exterior member in a direction in which their respective winding axes are perpendicular to the bottom,
each of the plurality of wound electrode assemblies is arranged in the rectangular exterior member such that the respective first bending regions are positioned on the side of the first side wall,
a winding-end-side end portion of the positive electrode plate and a winding-start-side end portion of the positive electrode plate are arranged in the flat region,
a winding-end-side end portion of the negative electrode plate and a winding-start-side end portion of the negative electrode plate are arranged in the flat region,
the winding-start-side end portion of the positive electrode plate and the winding-start-side end portion of the negative electrode plate are directed toward the first bending region and closer to the first bending region than the second bending region, and
the winding-end-side end portion of the positive electrode plate and the winding-end-side end portion of the negative electrode plate are directed toward the second bending region and closer to the second bending region than the first bending region.

10. A rectangular secondary battery comprising:
a rectangular exterior member having an opening, a bottom, a first side wall, a second side wall, a third side wall, and a fourth side wall;
a sealing plate that seals the opening; and
a plurality of wound electrode assemblies with a flat shape respectively obtained by winding a positive electrode plate and a negative electrode plate via a separator,
the plurality of wound electrode assemblies being arranged in the rectangular exterior member,
wherein each of the wound electrode assemblies has a flat region formed at its center, a first bending region having a bent outer surface formed on one end side of the flat region, and a second bending region having a bent outer surface formed on the other end side of the flat region,
a tape is attached to the outer surface of the first bending region,
the tape extends across no more than an entire length of the first bending region along a circumferential direction of a corresponding one of the wound electrode assemblies, an outermost circumferential surface of each of the wound electrode assemblies, other than the first bending region, is free of a tape attached thereto,
the plurality of wound electrode assemblies are arranged in the rectangular exterior member in a direction in which their respective winding axes are perpendicular to the bottom,
each of the plurality of wound electrode assemblies is arranged in the rectangular exterior member such that the respective first bending regions are positioned on the side of the first side wall,
a winding-end-side end portion of the positive electrode plate and a winding-start-side end portion of the positive electrode plate are arranged in the flat region and are directed toward the first bending region, and
a winding-end-side end portion of the negative electrode plate and a winding-start-side end portion of the negative electrode plate are arranged in the flat region and are directed toward the first bending region.

* * * * *